Sept. 23, 1924.
G. H. JUDIA
1,509,300
ANTIGLARE HEADLIGHT FOR VEHICLES
Filed Dec. 3, 1923
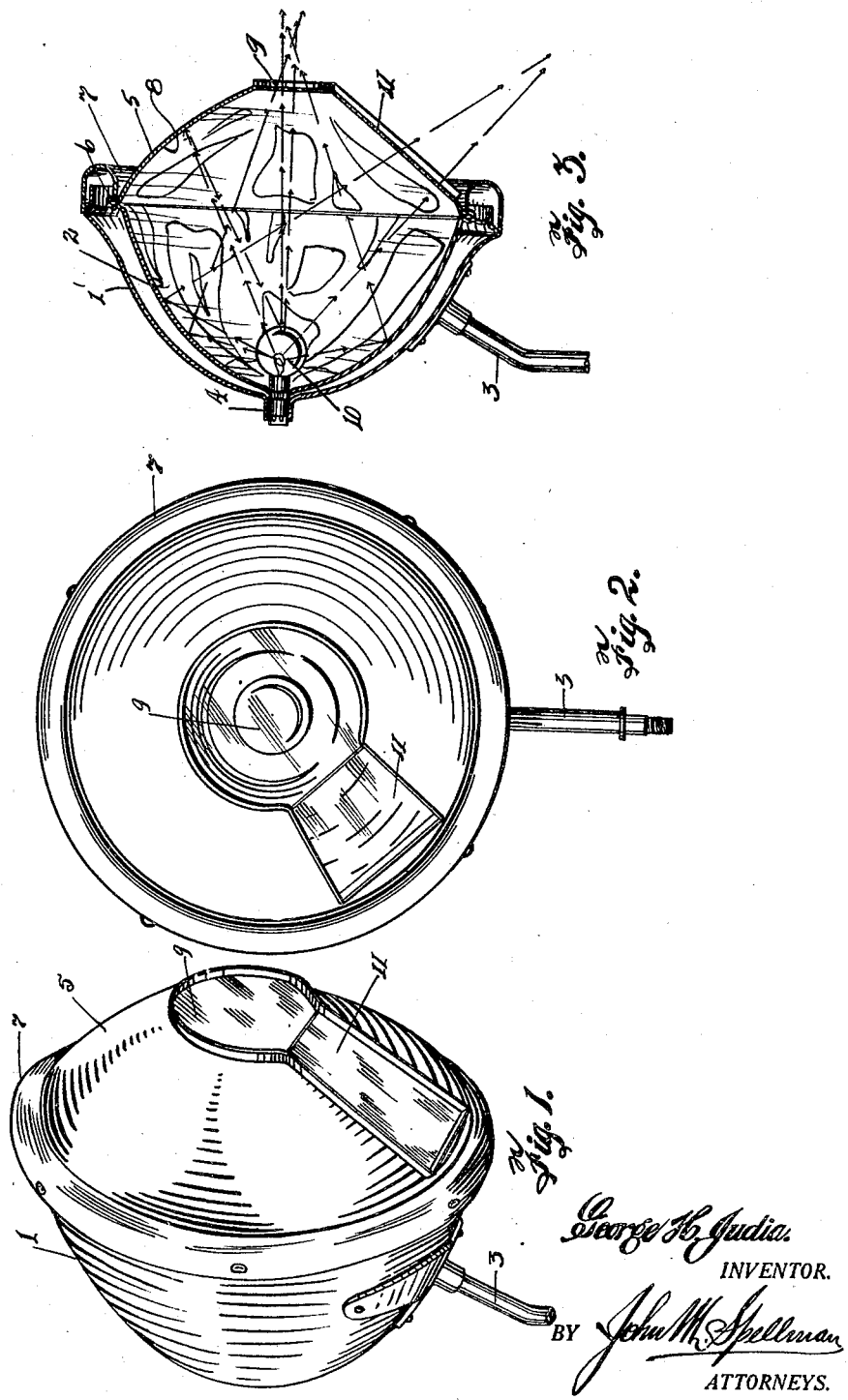

Patented Sept. 23, 1924.

1,509,300

UNITED STATES PATENT OFFICE.

GEORGE H. JUDIA, OF CISCO, TEXAS, ASSIGNOR OF ONE-FOURTH TO J. B. MULLNIX AND ONE-FOURTH TO JACK ANDERSON, BOTH OF CISCO, TEXAS.

ANTIGLARE HEADLIGHT FOR VEHICLES.

Application filed December 3, 1923. Serial No. 678,113.

*To all whom it may concern:*

Be it known that I, GEORGE H. JUDIA, a citizen of the United States, residing at Cisco, in the county of Eastland and State of Texas, have invented certain new and useful Improvements in Antiglare Headlights for Vehicles, of which the following is a specification.

This invention relates to vehicle lamps and has for its object the provision of a headlight for automobiles and motor vehicles, the object being to arrange and construct the lamp in such a manner that it will emit sufficient light to enable the driver to see a considerable distance ahead and also immediately in front of his vehicle.

Another object of the invention is to provide a lamp which will give the above mentioned advantages and at the same time eliminate the use of "dimmers" usually employed, to avoid glare of the light, and to utilize the full volume of light by a unique and novel arrangement of a reflector cover.

The invention will be more fully understood by reference to the following description taken in connection with the accompanying drawings forming a part hereof and wherein:

Figure 1 is a perspective view of a vehicle lamp embodying the invention.

Figure 2 is a front view thereof, and;

Figure 3 is a vertical sectional view of the lamp, illustrating the interior arrangement of reflectors and shield.

Referring more in detail to the drawings, 1 denotes a vehicle lamp body of usual type with reflector 2 and supporting rod 3 and lamp socket 4.

In carrying out the invention, the usual lamp lens is removed and a cone shaped reflector is placed over the front of the lamp in the manner illustrated in Figure 3. An annular ring 6 of pliable, soft material is interposed between the reflector cover and the lamp body to provide a tight fit for the reflector cover against the lamp, the rim 7 holding the former firmly in position.

The reflector cover 5 has a light reflecting surface 8 similar to the regular reflector 2, and at the center of the reflector cover is an opening 9 for the exit of light from the globe 10. The arrangement is such that the reflecting surface 2 throws some of the light rays from the globe directly through the aperture 9. The rays of light which are directed from reflecting surface 2 against reflecting surface 8 are again reflected in focus as shown by arrows in Figure 3, to the center of reflector 2 and so on until the light is passed through the aperture 9, the effect being to throw a shaft of light of relatively small diameter through aperture 9 a considerable distance ahead of the vehicle.

By reference to the drawing it will be seen that the aperture 9 is continued outward to the circumference of the cover 5 and a glass panel 11 placed therein. The purpose of this is to permit light to be reflected downward at a point directly in front of the vehicle. This permits the driver to see his nearness to passing vehicles and shows other motorists the distance or margin of safety in passing. The direction of the rays of light through the apertures 9 and through the panel 11 leaves a distinctly defined shadow where no light is displayed.

From the above it will be seen that the danger from glare of light is practically eliminated since the light from aperture 9 is small and the center or core of the light would only be reflected on any object for a second of time. Pedestrians and drivers of passing vehicles would thus not be blinded by the light such as would be the case if the cover 5 were not present.

It should be understood that the invention may be attached to any type of lamp without changing the lamp structure, it being merely necessary to remove the ordinary lamp rim 7, place the cover in position and screw back the rim 7. Also that the shell or body of the lamp at the front may be constructed with such modifications as to come within the intent and meaning of the following claims:

1. The combination with a headlight comprising a source of light and a reflector therefor, of a reflecting cover for said headlight consisting of a truncated cone-shaped body provided with a light emitting opening a portion of which is in the plane of the truncation and a portion of which is in the periphery, that portion of the opening in the periphery of the cover constituting an elongated, downwardly directed extension from that portion which is in the plane of the truncation.

2. The combination with a headlight comprising a source of light and a reflector therefor, of a reflecting cover for said headlight consisting of a truncated cone-shaped body provided with a light emitting opening in the center and the lower portion thereof, the axis of the cover being less than the axis of the reflector, the inner surface of said cover being reflecting.

In testimony whereof I have signed my name to this specification.

GEORGE H. JUDIA.